US012632343B2

(12) United States Patent
Brenner et al.

(10) Patent No.: US 12,632,343 B2
(45) Date of Patent: May 19, 2026

(54) IMPLEMENTING DATA PROTECTION POLICIES BASED ON DEFINED DATA LOSS LEVELS

(71) Applicant: Dell Products L.P., Round Rock, TX (US)

(72) Inventors: Adam Brenner, Mission Viejo, CA (US); Arun Murti, Mission Viejo, CA (US); Mark Malamut, Aliso Viejo, CA (US)

(73) Assignee: Dell Products L.P., Round Rock, TX (US)

( * ) Notice: Subject to any disclaimer, the term of this patent is extended or adjusted under 35 U.S.C. 154(b) by 70 days.

(21) Appl. No.: 18/651,428

(22) Filed: Apr. 30, 2024

(65) Prior Publication Data

US 2025/0335308 A1     Oct. 30, 2025

(51) Int. Cl.
| | |
|---|---|
| *G06F 3/06* | (2006.01) |
| *G06F 11/1446* | (2026.01) |
| *G06F 11/30* | (2006.01) |
| *G06F 21/60* | (2013.01) |

(52) U.S. Cl.
CPC ........ *G06F 11/1461* (2013.01); *G06F 3/0619* (2013.01); *G06F 3/065* (2013.01); *G06F 3/067* (2013.01); *G06F 11/1464* (2013.01); *G06F 11/3034* (2013.01); *G06F 21/60* (2013.01)

(58) Field of Classification Search
CPC ............. G06F 11/1461; G06F 11/1464; G06F 11/3034; G06F 3/0619; G06F 3/065; G06F 3/067; G06F 21/60
See application file for complete search history.

(56) References Cited

U.S. PATENT DOCUMENTS

| | | | | |
|---|---|---|---|---|
| 2017/0091047 A1* | 3/2017 | Bangalore | ........... | G06F 16/2358 |
| 2019/0132390 A1* | 5/2019 | Chakraborty | ....... | H04L 67/1097 |
| 2020/0409803 A1* | 12/2020 | Naidu | ................. | G06F 11/1451 |
| 2021/0224164 A1* | 7/2021 | Liao | .................... | G06F 11/1448 |

* cited by examiner

*Primary Examiner* — Hiep T Nguyen
(74) *Attorney, Agent, or Firm* — Staniford Tomita LLP

(57) ABSTRACT

Providing data protection by triggering backups for data protection based on data loss threshold. A protection policy is configured to protect an asset stored in a storage device in a network. A metric representing an amount of change of data of the asset is defined, along with a threshold value of the metric. The system is periodically monitored to determine if the metric reaches the threshold, and if so, a backup of the asset is triggered under the protection policy. The trigger-based data protection system backs up data on the basis specific data asset change thresholds, rather than on simple time periods or on a continuous basis.

15 Claims, 4 Drawing Sheets

100

BACKUP
MANAGEMENT
PROCESS
112

102

Server

118

BACKUP USING
DATA LOSS
TRIGGERS
115

NETWORK
110

114

104   VM

FS
CLIENTS
108

VM vCenter

106

200

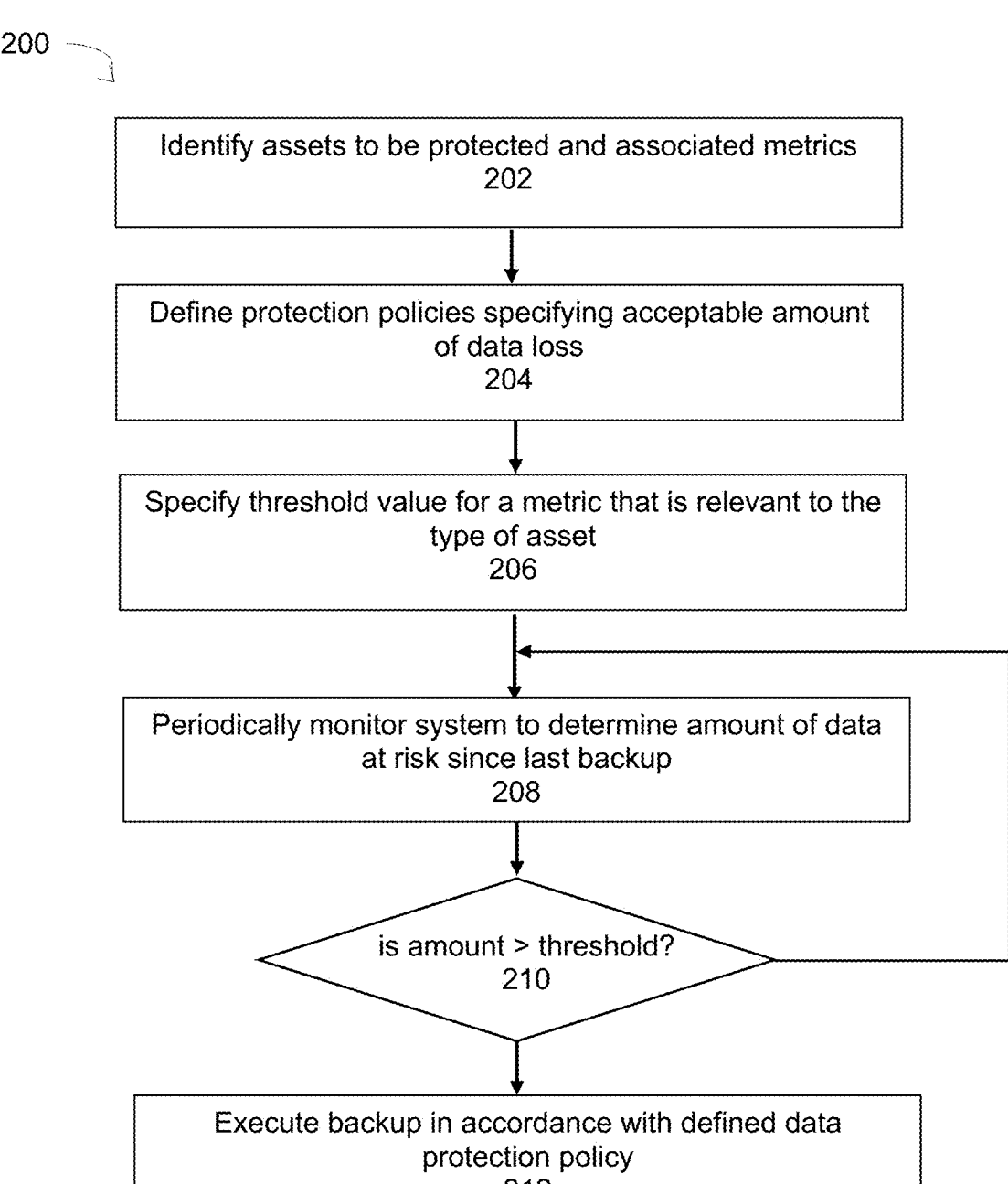

Identify assets to be protected and associated metrics
202

Define protection policies specifying acceptable amount
of data loss
204

Specify threshold value for a metric that is relevant to the
type of asset
206

Periodically monitor system to determine amount of data
at risk since last backup
208 is amount > threshold?
210

Execute backup in accordance with defined data
protection policy
212

FIG. 2

IMPLEMENTING DATA PROTECTION POLICIES BASED ON DEFINED DATA LOSS LEVELS

TECHNICAL FIELD

Embodiments are generally directed to large-scale data storage systems and more specifically to implementing data protection policies based on data loss levels rather than time schedules.

BACKGROUND

Backup software is used by large organizations to store their data for recovery after system failures, routine maintenance, archiving, and so on. Backup sets are typically taken on a regular basis, such as hourly, daily, weekly, and so on, and can comprise vast amounts of information. Backup programs are often provided by vendors that provide backup infrastructure (software and/or hardware) to customers under service level agreements (SLA) that set out certain service level objectives (SLO) that dictate minimum standards for important operational criteria such as uptime and response time, etc. The various protection requirements and different network entities, i.e., data sources and storage devices, dictate the various data protection policies that are defined and used in a backup system.

Current data protection (DP) systems typically backup assets on a time-based schedule. A time-based is a very easy model for determining when a backup should start, such as every 6 hours, each day, etc. Historically, this has been the primary model for all data protection systems. However, such time-based methods do not adequately address business needs, where the true goal is to manage the cost of data loss. All data has a value to a business, otherwise it would not be captured and protected, and any non-continuous protection method will have a loss of data risk, and businesses should be able quantify the acceptable amount of data loss.

What is needed, therefore, is a backup system that allows a user to specify the acceptable amount of data loss in data protection policies, as opposed to simply backing up data according to a simplistic time schedule.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Networker, Data Domain, RecoverPoint, and Data Domain Restorer are trademarks of DellEMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

FIG. 2 is a flowchart that illustrates a method backing up data using data loss triggers, under some embodiments.

DETAILED DESCRIPTION

Figure 1:
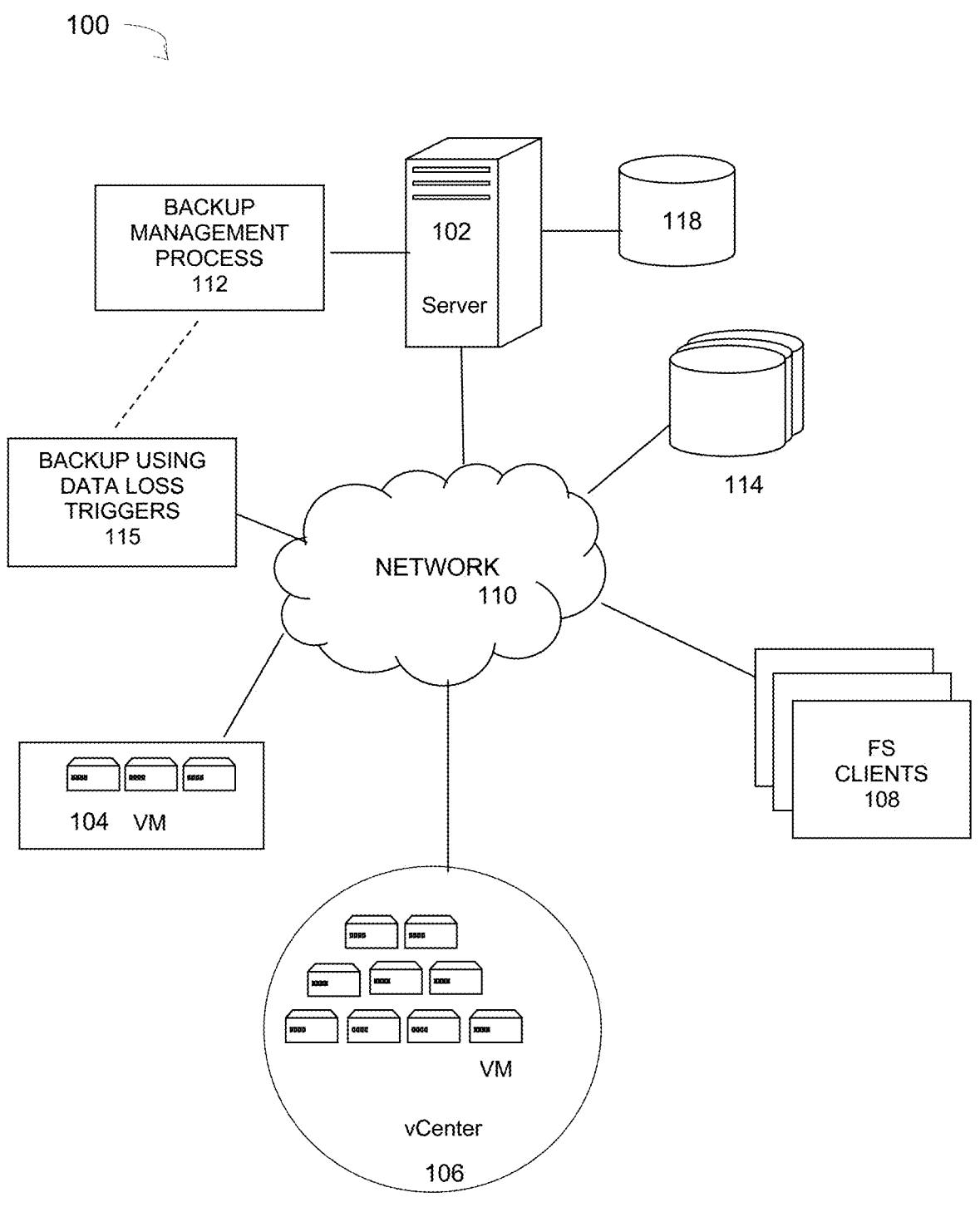
FIG. 1 is a diagram of a large-scale network implementing a backup system using data loss triggers for data protection, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve automated data storage techniques in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

FIG. 1 is a diagram of a large-scale network implementing a backup system using data loss triggers for data protection, under some embodiments. System 100 implements one or more processes and components of a data protection that triggers backups based on certain operational conditions, such as number of transactions (e.g., 2,000 database transactions per week), percentage change rate in a file system (e.g., 2% change rate), and the like. This mechanism allows a business to better manage the cost of any potential data loss compare to current systems that strictly initiate backups according to a set schedule (e.g., every week), or that implement continuous data protection, which can be expensive.

As shown in FIG. 1, system 100 includes a network server computer 102 coupled directly or indirectly to the target VMs 106, and to data sources 108 through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud-computing platform.

The data sourced by system 100 may be stored in any number of other storage locations and devices, such as local client storage, server storage (e.g., 118), or network storage (e.g., 114), which may at least be partially implemented through storage device arrays, such as RAID components. The storage 114 may represent Network Attached Storage (NAS), which is generally dedicated file storage that enables multiple users and heterogeneous client devices to retrieve data from a centralized disk. Users on a local area network (LAN) can access the shared storage via a standard Ethernet connection. Other similar systems may also be used to implement an NAS resource.

Embodiments can be used in a physical storage environment, a virtual storage environment, or a mix of both, running a deduplicated backup program. In an embodiment, system 100 includes a number of virtual machines (VMs) or groups of VMs that are provided to serve as backup targets. Such target VMs may be organized into one or more vCenters (virtual centers) 106 representing a physical or virtual network of many virtual machines (VMs), such as on the order of thousands of VMs each. The VMs serve as target storage devices for data backed up from one or more data sources, such as file system (FS) clients 108, or other backup clients. Other data sources having data to be protected and backed up may include other VMs 104. The data sourced by the data source may be any appropriate type of data, such as database data that is part of a database management system. In this case, the data may reside on one or more storage devices of the system, and may be stored in the database in a variety of formats.

In system 100, server 102 executes a data storage or backup management process 112 that coordinates or manages the backup of data from one or more data sources 120 to storage devices, such as network storage 114, client storage, and/or virtual storage devices 104. The data sourced by the data source may be any appropriate data, such as database data that is part of a database management system, and the data may reside on one or more hard drives for the database(s) in a variety of formats. In an embodiment, the backup process 112 uses certain known full and incremental (or differencing) backup techniques along with a snapshot backup process that is used to store an image or images of the system(s) to be backed up prior to the full or incremental backup operations.

In an embodiment, the network system 100 may be implemented as a DellEMC PowerProtect Data Manager (or similar) data protection system. This is an enterprise-level data protection software platform that automates data backups to tape, disk, and flash-based storage media across physical and virtual environments. A number of different operating systems (e.g., Windows, MacOS, Linux, etc.) are supported through cross-platform supports. Deduplication of backup data is provided by integration with systems such as DellEMC Data Domain and other similar storage solutions. Thus, the server 102 may be implemented as a DDR Deduplication Storage server provided by DellEMC Corporation. However, other similar backup and storage systems are also possible. In a general implementation, a number of different users (or subscribers) may use backup management process to back up their data on a regular basis to virtual or physical storage media for purposes of data protection. The saved datasets can then be used in data restore operations to restore any data that may be lost or compromised due to system failure or attack.

In an embodiment, system 100 may represent part of a Data Domain Restorer (DDR)-based deduplication storage system, and server 102 may be implemented as a DDR Deduplication Storage server provided by DellEMC Corporation. However, other similar data storage systems are also possible. A deduplication storage system generally represents a single-instance storage system in which redundant copies of data are eliminated to reduce storage overhead. Redundant data blocks are replaced with a pointer to the unique data copy so that only one unique instance of data is stored on the storage media (e.g., flash memory, disk, tape, etc.).

The data protection server 102 executes backup and recovery software that are crucial for enterprise-level network clients. Users rely on backup systems to efficiently back up and recover data in the event of user error, data loss, system outages, hardware failure, or other catastrophic events to allow business applications to remain in service or quickly come back up to service after a failure condition or an outage. Secure and reliable backup processes form the basis for many information technology (IT) services. Large-scale data storage networks rely on periodic or continuous data protection (CDP) methods using snapshot copies to automatically save copies of changes made to the data. This allows the network to capture earlier versions of the data that the user saves, thus providing the ability to restore data to any point in time in the event of hardware failure, system outages, and other significant disruptive events.

As used herein, the term metadata generally means a set of information that describes or provides information about other data. Metadata describes the actual content or file data, such as by specifying the file name, file type, file location, and so on. Metadata is generally many orders smaller than the content data (which can be huge depending on the application generating the file), and uniquely identifies the file comprising the content data, thus providing an efficient way to catalog, index, and otherwise process the file containing the content data.

Data protection systems (e.g., Avamar, Networker and PowerProtect Data Manager from DellEMC) require a user to create a protection policy that protects all or part of one or more data assets. By protecting assets, this allows data protection products to backup and restore the assets, which in turn offer protection and recovery of data on the assets. Policies allow a user or system administrator to specify several parameters of the backup process, such as the datasets to be backed up, storage targets, backup types (full, incremental, differential, etc.), and so on. One critical parameter of present protection policies is the frequency of data backups. Typically this period is variable so that a user can specify backups at a desired time, such as daily, weekly, monthly, quarterly, and so on. Modern systems, such as Dell RecoverPoint and similar systems, may also provide continuous backups, which can impose quite an expense. Whether periodic or continuous, present backup systems are tied to a chronological basis for taking backups. That is, backups are triggered solely on the basis of a time trigger, once a week, once a month, or as frequently as possible in the continuous backup case. Such systems are triggered only in terms of time and no other consideration, thus limiting their effectiveness with respect to other possible business or operational concerns.

Embodiments of process 115 provide data protection using backups triggered by certain defined data loss or risk metrics, rather than simple time periods. FIG. 2 is a flowchart that illustrates a method backing up data using data loss triggers, under some embodiments. Process 200 of FIG. 2 begins with identifying assets to be protected by the data protection system 100, along with corresponding metrics that quantify data at risk. Assets can range from relevant devices, virtual machines, data centers, and so on. They can also be datasets organized in namespaces, directories, file systems, and so on.

An appropriate data protection policy or policies are then defined to back up the assets, as desired. An acceptable amount of data loss is defined in these data protection policies, 204. The data loss can be specified and measured in any appropriate manner, such as amount of data (e.g., in KB or GB) that is affected by transactions or change rates in the system.

This amount of data represents the data at risk if a backup operation were to fail or the system fails after a last backup. That is, if a number of database transactions is not backed up, that number represents the data loss for the failure. Similarly, if the data change rate changes a certain amount of data in a period of time, that amount of data is the data loss for a failed backup in that period of time. Other examples of data loss measures are also possible, such as number of changed data elements (e.g., files or objects), changes in file count, and so on.

It should be noted that the terms "measure" and "metric" may be used interchangeably, however, in some usage "measure" may be used as a verb, while "metric" may be used as a noun. For example, a database change is measured in number of transactions and each measurement (or "measure") taken results in a point-in-time metric.

In step 206, the a threshold value of a metric that is relevant to the type of asset is specified. In general, the threshold value is set by a user based on how much data they are willing to put at risk for each policy. Different users may have different tolerances for risk, and may thus set a DB transaction count to a larger or smaller value, for example. Similarly, one user may set a lower threshold for a set of mission-critical databases (i.e., they have lower tolerance for risk of losing that data) and a higher threshold for a set of test databases (i.e., they are willing to lose some or all of that data), and so on.

The system is then monitored periodically to determine that amount of data that is at risk (i.e., changed since last backup), 208. It should be noted that the terms "data loss" and "change" may be used interchangeably in that the system monitors the amount of data of an asset changed since a last backup operation, which in turn, represents an amount of data at risk of loss in the event of a system failure after the last backup operation.

If the amount of data at risk is greater than the threshold, as determined in step 210, the system executes the backup as triggered by this condition in accordance with the defined data protection policy, 212. If not, the process iterates through the periodic monitoring operation, 208.

As shown in FIG. 2, an initial step 202 involves identifying or defining appropriate metrics for an asset to be protected. The metric typically depends on the asset type. For example, for a database, the metric may represent transaction count or log file size increase, so that one or both of these are used to measure an amount of data at risk after a previous backup. For a file system, the metric may be the number of files changed or a storage size change. For data objects or data stored in object storage, the metric may comprise the number of changed objects, such as in terms of an absolute number or percentage of the storage. Other assets and associated metrics may also be defined.

Figure 3:
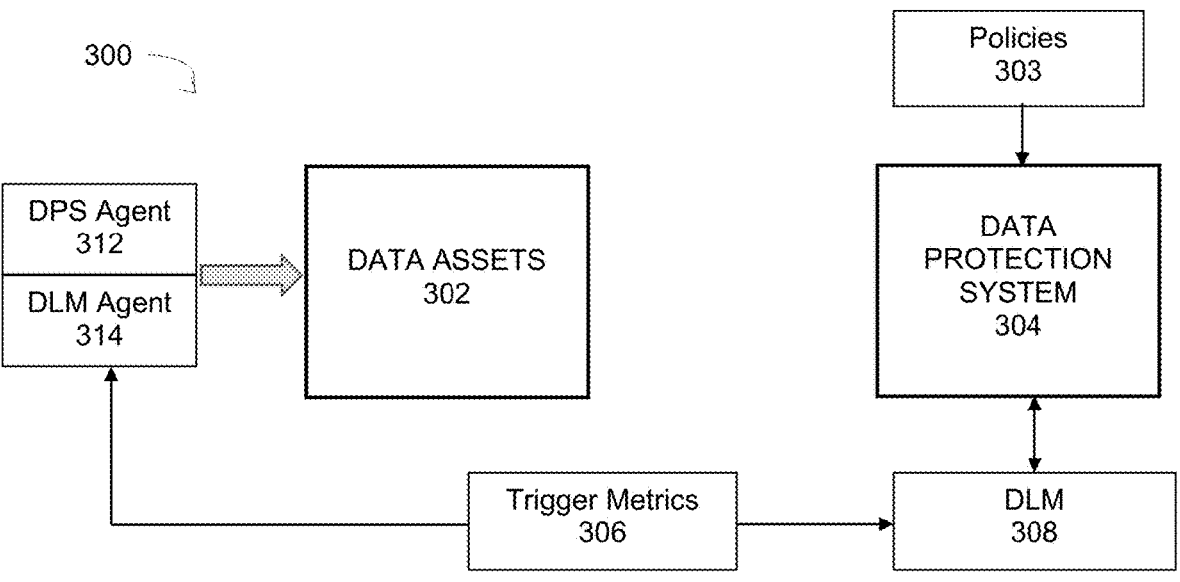
FIG. 3 illustrates a system that implements backing up data using data loss triggers, under some embodiments.

FIG. 3 illustrates a system that implements backing up data using data loss triggers, such as shown for the method of FIG. 2, under some embodiments. As shown in FIG. 3, system 300 comprises data assets 302 that are backed to target storage by data protection system (DPS) 304. A data loss monitor (DLM) 308 that is a component or process that runs within an instance of the DPS, 304. Overall, system 300 triggers backups based on information from agents (312, 314) and the policies 303 configured within the DPS 304 for assets or asset types or groups 302.

The DPS 304 provides information about the environment to the DLM 308 including asset sources and hosts. For this information, the DPS reads data input/output operations (IOPS) provided directly for each, and can also be used as a throttling value. It also provides information regarding proxies and data movers, as well as storage targets, for which it writes IOPS provided directly for each target, and can also be used as a throttling value. It further provides information regarding the network link speed between each of the above components.

A DLM agent 314 runs on each asset/host. This agent sends trigger metrics 306 to the DLM 308. It can be configured to run as a plug-in to an existing DPS agent 312 to minimize processing overhead.

Figure 4:
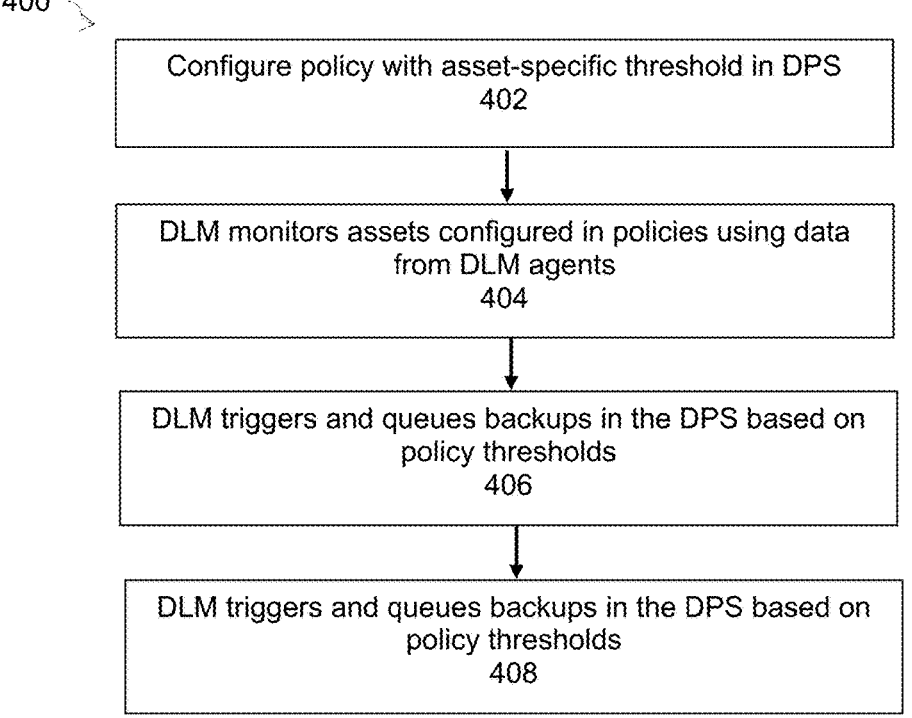
FIG. 4 is a flowchart that illustrates on overall method of performing trigger-based backups in system of FIG. 3, under some embodiments.

FIG. 4 is a high-level flowchart that illustrates on overall method of performing trigger-based backups in system of FIG. 3, under some embodiments. As shown in process 400, a backup administrator configures one or more policies with asset-specific thresholds in the DPS 304, step 402. In an embodiment, a policy contains the asset type, asset sources, storage target, priority, blackout window (optional), retention period, and other appropriate policy parameters, such as utilized by the backup program.

The DLM 308 monitors the assets 302 configured in the policies 303 using data from DLM agents 314, step 404. The DLM 308 triggers and queues backups in the DPS 304 based on the policy defined thresholds, step 406, and the DPS runs the queued backups, step 408. Process 400 results in a backup occurring when a trigger threshold is reached, unlike current systems that instead backup according to fixed schedule (e.g., back up once per day at time, t).

With respect to step 402 of FIG. 4, in an embodiment, the policies 303 can configured in the DPS by a wizard process or similar GUI-based input process through which a backup administrator enters relevant information through appropriate input prompts. Certain parameters can be specified in one or more display screens, such as asset type, asset sources, and storage target. Assets can be of several different types depending on the system and applications, such as file directories, databases, servers, virtual machines (VMs), and so on. The type of asset may dictate a specific protection policy, such as backup critical directories daily and only to a specific target. A given policy can contain one asset type only (e.g., VMs only). Likewise, depending on system configuration, data can be sourced from various different asset sources, such as data centers, servers, and so on. The asset sources are provided in a list of hosts containing assets of a specific asset type (e.g., ESXi servers for VM assets). The storage target specifies the system or media on which to store backup copies of the assets (e.g., PowerProtect DD).

Other parameters that can be input for the configuration step 402 include priority, blackout window, and retention period, among other possible policy parameters. In an embodiment, the priority can be a number from 0-10, with 0 being the highest priority and 10 being the lowest priority, or any other similar scale. The blackout window specifies a time range during which backups must not run so as to avoid disruption to production systems, or for other similar reasons.

As further shown in FIG. 4, step 402 includes a user selected threshold at which to trigger a backup for the given assets from a range of possible values. Any number of different measurements and associated thresholds can be set for different assets to trigger backups. For example, a database (D1) can measured in transactions, and a threshold may be set at 1000 transactions, so that a backup is triggered after every 1000 transactions of D1. In another example, a database (D2) may be measured by percentage size increase of the transaction log, and an example trigger may be 1%, so that a backup is triggered if and when D2 changes by 1%. Instead of percentage change, a database (D3) may be measured by percentage storage increase of the transaction log, for example, a threshold may be 80 GB to trigger a backup. For a different type of asset, such as a file server (F1), the measure may be embodied by a percentage change of file count. Thus, as an example, for F1, a backup may be triggered if 0.08% of files have changed. For an object storage server (O1), the measure may be an absolute change in object count. In this case, a backup may be triggered if 750 objects have been changed (added, deleted or modified).

It should be noted that these specific measures and threshold values are provided for purposes of illustration only, and many other measures and threshold values can be used.

In an embodiment, administrators may choose to override the user input range or values of the thresholds in certain circumstances, such for new systems, specific tests being run, and so on. In this case, the DPS 304 is configured to provide reports on assets that may then be out of compliance.

Certain practical configuration or operational constraints may affect the threshold value settings configured in the DPS in step 402. For example, there may be a limit to the total number of backups per day that can be taken for a given asset or asset group based on factors including, but not limited to: read IOPS on the host storage, network link speed between the host and the DPS (or any required proxies or data movers), and write IOPS on the storage target.

In system 300, the DPS 304 is responsible for collecting the IOPS values from the system administrator and supplying it to the DLM 308. A lower IOPS value than the storage can technically provide may be supplied to enforce data throttling. It is typically the responsibility of the administrator to factor in the IOPS impact of the backup itself on the host.

Using the factors listed above (i.e., read IOPS on the host storage, network link speed between host and DPS, write IOPS on the storage target), the DLM 308 calculates the range for a policy such that the minimum value would allow all assets in the policy to back up once per hour, and the maximum value would allow all assets in the policy to back up once per day. Given these rules, a low threshold equals more backups, and a high threshold equals fewer backups.

After the policy is configured (step 402), the DLM 308 monitors the data received from the DLM agent 314 running on each asset 302 (step 404). If any asset's chosen measure exceeds the threshold set in the policy for that asset, the DLM then queues a backup for that asset in the DPS, step 406. The backups queued by the DPS are run based on logic in the DPS that accounts for the maximum concurrent jobs that can be processed by the DPS itself, the maximum number of concurrent streams supported by each storage target, and other similar rules.

If two or more backups are queued to run against a storage target with only one available stream, then the backup with the highest priority set in the policy will run first. If all queued backups are at the same priority, then the least recently backed up asset will be backed up first. Different or additional conflict resolution rules can also be defined.

Figure 5:
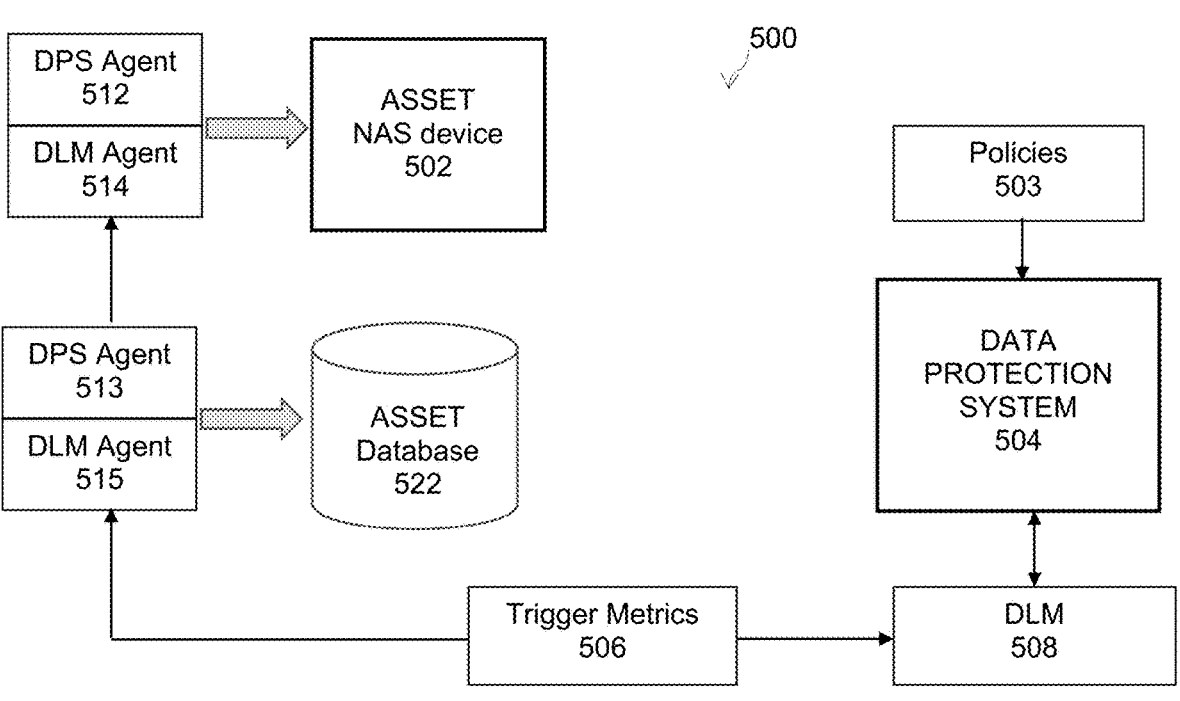
FIG. 5 is a flowchart that illustrates on overall method of performing trigger-based backups for an example application, under some embodiments.

FIG. 5 is a flowchart that illustrates on overall method of performing trigger-based backups for an example application, under some embodiments. System 500 of FIG. 5 may represent any application or environment that has different assets, and in an example embodiment represents an e-commerce website that has a database 522 storing orders, product information, customer reviews, account information, etc., and a network addressable storage (NAS) device to host static content, such as product photos, users manuals, etc. Other assets can also be included, such as Virtual Machines to serve content to web browsers, and so on.

Appropriate policies 503 can be defined to trigger backups for the different assets based on thresholds set for the appropriate asset measurements or metrics. These policies are usually configured by a backup administrators who decides when a backup should be triggered based upon the assets meeting the defined thresholds. For example, a backup may be when any of the following occur: (1) 1,000 or more database transactions are been committed since a last backup, or (2) 2% or more of the files have changed on the NAS since last backup.

For the example embodiment of FIG. 5, two DLM agents (514 and 515) are deployed in conjunction with existing backup agents (512 and 513). As shown, there is one DLM agent 515 for the database 522 backup, and one DLM agent 514 for NAS 502 backups. These DLM agents will monitor their respective workload (Database, NAS, etc.) for backup triggers specified in the policies 503 by the user.

When a trigger threshold has been met, the DLM 508 will alert the DPS 504 to perform a backup of the corresponding asset.

Embodiments of the trigger-based data protection system thus backs up data on the basis specific data asset change thresholds, rather than on simple time periods or on a continuous basis. This results in entities being better able to manage the cost of any potential data loss.

As described above, in an embodiment, system 100 include certain processes that may be implemented as a computer implemented software process, or as a hardware component, or both. As such, it may be an executable module executed by the one or more computers in the network, or it may be embodied as a hardware component or circuit provided in the system. The network environment of FIG. 1 may comprise any number of individual client-server networks coupled over the Internet or similar large-scale network or portion thereof. Each node in the network(s) comprises a computing device capable of executing software code to perform the processing steps described herein.

Figure 6:
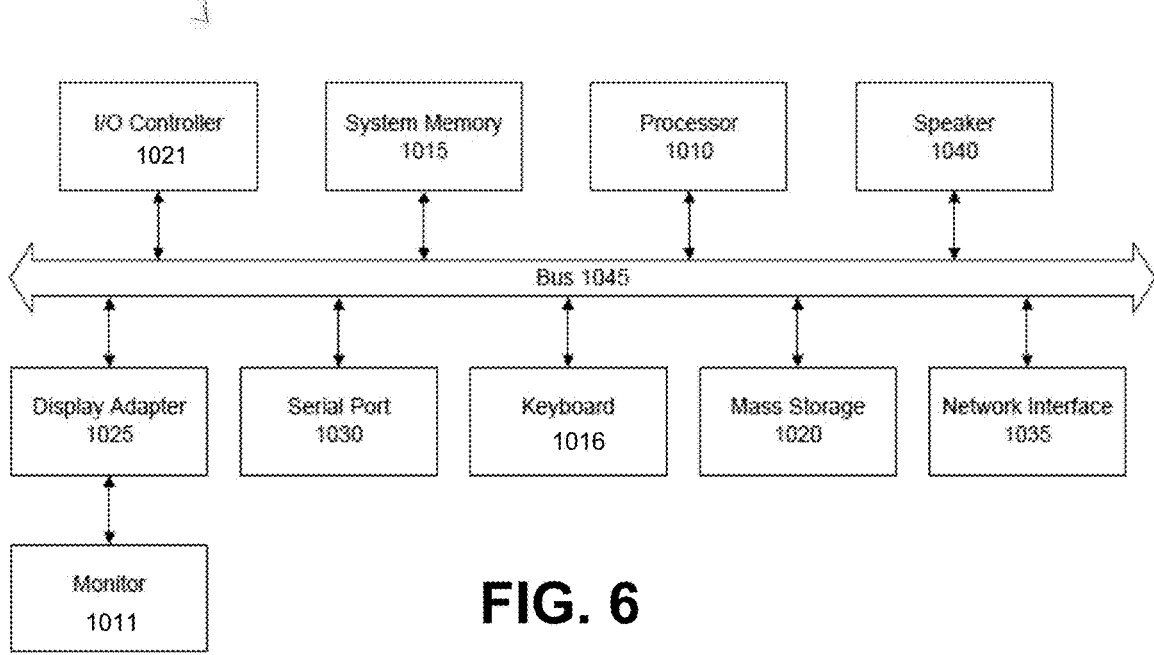
FIG. 6 is a block diagram of a computer system used to execute one or more software components of a system for trigger-based backups, under some embodiments.

FIG. 6 is a block diagram of a computer system used to execute one or more software components of a system implementing trigger-based backups, under some embodiments. The computer system 1000 includes a monitor 1011, keyboard 1016, and mass storage devices 1020. Computer system 1000 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 shown in FIG. 4 is an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Although certain embodiments have been described and illustrated with respect to certain example network topographies and node names and configurations, it should be understood that embodiments are not so limited, and any practical network topography is possible, and node names and configurations may be used. Likewise, certain specific programming syntax and data structures are provided herein. Such examples are intended to be for illustration only, and embodiments are not so limited. Any appropriate alternative language or programming convention may be used by those of ordinary skill in the art to achieve the functionality described.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of triggering backups based on data protection based on data loss thresholds, comprising:

configuring a protection policy to protect an asset stored in a storage device in a network;

determining an amount of risk posed to the asset if a backup operation fails as a metric representing an amount of data lost for the metric;

defining a threshold value of the metric, configuring a data protection system (DPS) to execute the backups from a data source to target storage;

configuring a data loss monitor (DLM) to run as an instance within the DPS;

configuring a DLM agent to run in the asset as a plug-in to a DPS agent;

sending, from the DLM agent, trigger metrics to the DLM;

periodically monitoring, by the DLM, the network through the trigger metrics to determine if the metric reaches the threshold, and if so, triggering a current backup of the asset under the protection policy.

2. The method of claim 1 wherein the DPS implements a deduplication backup process to back up the asset from the storage device to a specified storage target, and wherein the storage devices comprises at least one of: network attached storage (NAS), object storage, local storage, or cloud networks.

3. The method of claim 2 wherein the DPS provides to the DLM network information comprising at least one of asset source information, data mover information, storage target information, and network link speeds.

4. The method of claim 3 further comprising:

configuring the DLM agent to track a present workload of the asset wherein the workload comprises read/write input/output operations per second (IOPS); and monitoring, in the DLM, workload information from the DLM agent.

5. The method of claim 4 wherein the workload information comprises an amount of data of the asset changed since a last backup operation.

6. The method of claim 1 wherein the policy defines the threshold and other data protection parameters comprising at least: a storage target of the asset, a priority of the asset, a blackout window barring backup during defined periods, and a retention period of the backup.

7. The method of claim 6 wherein the asset comprises a collection of data to be protected and comprising at least one of: a database, a directory, a file system, a virtual machine, and a data center.

8. The method of claim 7 wherein the threshold comprises a number of transactions of the asset after a last backup, a percentage size increase of a transaction log of the asset after the last backup, a percentage storage increase of the transaction log after the last backup, or an absolute change in data element count of the asset after the last backup.

9. The method of claim 8 further comprising defining a range of values for the threshold to configure the policy to back up the asset at least once during a defined time period, wherein a low threshold value in the range results in more backups during the defined time period and a high value in the range results in fewer backups during the defined time period.

10. A computer-implemented method of providing data loss-based data protection for data assets stored in a large-scale data storage system, comprising:

providing a data protection system (DPS) backing up a data asset from a data source to a storage target in accordance with a defined policy;

determining an amount of risk posed to the asset if a backup operation fails as a metric representing an amount of data lost for the metric;

configuring a data protection system (DPS) to execute the backups from a data source to target storage;

configuring a data loss monitor (DLM) to run as an instance within the DPS;

configuring a DLM agent to run in the asset as a plug-in to a DPS agent;

sending, from the DLM agent, trigger metrics to the DLM;

monitoring, by the DLM, transactions of the data asset in a data loss monitor (DLM) agent associated with a DPS agent of the asset and coupled to DLM of the DPS;

defining a measure of the transactions and a threshold value of the measure based on the trigger metrics; and triggering, in accordance with the defined policy, a current backup when the measure of the transactions meets the defined threshold.

11. The method of claim 10 wherein the asset consists of an asset type and comprises a collection of data to be protected and comprising at least one of: a database, a directory, a file system, a virtual machine, and a data center.

12. The method of claim 11 wherein the threshold comprises a number of transactions of the asset after a last backup, a percentage size increase of a transaction log of the asset after the last backup, a percentage storage increase of the transaction log after the last backup, or an absolute change in data element count of the asset after the last backup.

13. The method of claim 12 wherein the transactions comprise read/write input/output operations (IOPS) measuring an amount of data of the asset changed since a last backup operation, and represents an amount of data at risk of loss in the event of a system failure after the last backup operation.

14. The method of claim 12 wherein the policy defines the threshold and other data protection parameters comprising at least: a storage target of the asset, a priority of the asset, a blackout window barring backup during defined periods, and a retention period of the backup.

15. The method of claim 14 wherein the DPS provides to the DLM network information comprising at least one of asset source information, data mover information, storage target information, and network link speeds.

* * * * *